ns United Stat [11] 3,955,878
Nowak [45] May 11, 1976

[54] FIBER OPTIC TRANSMISSION LINE

[75] Inventor: Gerhard H. Nowak, San Diego, Calif.

[73] Assignee: International Telephone and Telegraph Corporation, New York, N.Y.

[22] Filed: Feb. 13, 1975

[21] Appl. No.: 549,730

[52] U.S. Cl. ............................. 350/96 R; 350/96 B
[51] Int. Cl.² ............................................ G02B 5/16
[58] Field of Search ................. 350/96 R, 96 B, 320

[56] References Cited
UNITED STATES PATENTS

| | | | |
|---|---|---|---|
| 3,050,907 | 8/1962 | Hicks, Jr. et al | 65/24 |
| 3,510,195 | 5/1970 | Noble | 350/96 B |
| 3,766,307 | 10/1973 | Andrews, Jr. | 350/96 B |
| 3,810,784 | 5/1974 | Wong et al. | 350/96 B |

Primary Examiner—John K. Corbin
Assistant Examiner—Stewart Levy
Attorney, Agent, or Firm—Thomas L. Peterson

[57] ABSTRACT

A fiber optic transmission line suitable for use in a submarine cable wherein one or more helically formed optical fibers are positioned lengthwise within a flexible tubular member containing a semi-fluid gelantinous substance. Due to the helical form of the fibers, the fibers are not stressed even when the line is subjected to axial load. The gelantinous substance retains the fibers in their helical form and prevents abrasion of the fibers. A method for forming such a fiber optic transmission line is also disclosed.

9 Claims, 11 Drawing Figures

FIBER OPTIC TRANSMISSION LINE

BACKGROUND OF THE INVENTION

This invention relates generally to a fiber optic transmission line and, more particularly, to such a line suitable for use in an optic signal transmitting cable, such as a submarine cable.

Fiber optic elements now have an attenuation low enough for them to be considered for routine signal communication in much the same manner as coaxial cables are now used. Fiber optic elements have the advantage of thousands of times more band width as well as smaller size and weight than electromechanical cables. The problem associated with incorporating optical fibers in cables is that they are very fragile and are easily abraded or broken. Recent information further indicates that the optical transmission characteristics of the fibers are seriously degraded when the fibers are subjected to even small stresses. For example, an optical glass fiber should not be strained more than 0.1%. The strain of a typical electromechanical light weight cable when lowered to the ocean floor is in the order of 0.1%. For an electromehcanical steel armored cable, the strain will be in the order of 1% because of the weight of the steel armor. Obviously, therefore, an optical fiber in its normal form cannot be incorporated in a conventional electromechanical-type cable without the transmission characteristics of the fiber being subjected to degradation. Also, since optical fibers are extremely fragile and are easily abraded or broken, they cannot be processed in standard cable manufacturing equipment in their normal form.

What is desired, therefore, and constitutes one purpose of the present invention is to provide a fiber optic transmission line subassembly which has sufficient strength and protection for processing on standard cable manufacturing equipment. Another purpose of the invention is to provide a fiber optic transmission line that is designed so that it will significantly limit, if not eliminate, stress and abrasion to the optical fibers therein even though the line is contained in a cable that is operated in a standard manner and therefore subject to substantial stresses.

SUMMARY OF THE INVENTION

According to the principal aspect of the present invention, there is provided a fiber optic transmission line subassembly for an optical signal tansmitting cable. The line comprises one or more optical fibers positioned lengthwise within a flexible tubular member. Each fiber has such a configuration that its fiber axis length is greater than the length of the tubular member when the latter is in a relaxed condition so that the fiber is essentially free of axial stress when the tubular member is under load. Preferably, the optical fibers are helically formed, although they may have other wavelike configurations. A fluid-like medium substantially fills the tubular member so as to restrain longitudinal and lateral movement of the fibers within the member. Such a transmission line subassembly may be subjected to stresses and substantial bends without damage occurring to the optical fibers therein, due to the fact that the helically wound fibers may elongate without applying an axial stress to the fibers per se. Also, the fluid-like medium filling the tubular member tends to retain the fibers in their helical form, and prevents significant lateral movement of the fibers and abrasion thereof.

The transmission line subassembly may therefore be processed through standard extruding equipment for forming armoring and outer jacketing thereon to form a cable, and may be utilized with other lines to form a multi-strand cable by twisting the lines together or laying them in side-by-side parallel relationship within an outer casing. The transmission line of the present invention may be utilized in a conventional manner, as by lowering the same to the ocean floor or the like, thus subjecting it to heavy bends and longitudinal stresses without axially stressing the fibers, thereby permitting optical signal transmission without degradation.

According to an other aspect of the invention, there is provided a method for forming the aforementioned fiber optic transmission line. One or more optical fibers are helically wound about a core which is capable of becoming a semi-fluid gelantinous substance when subjected to a solvent. A thin layer is formed over the core carrying the optical fibers so as to stabilize the fibers on the core. A tubular member is then formed around the fiber-core assembly. The tubular member is filled with a solvent which softens the core and fiber-stabilizing layer producing a gel-like semi-fluid medium that supports the fibers within the casing and retains them in their helical form.

DESCRIPTION OF THE PREFERRED EMBODIMENTS

Figure 1:
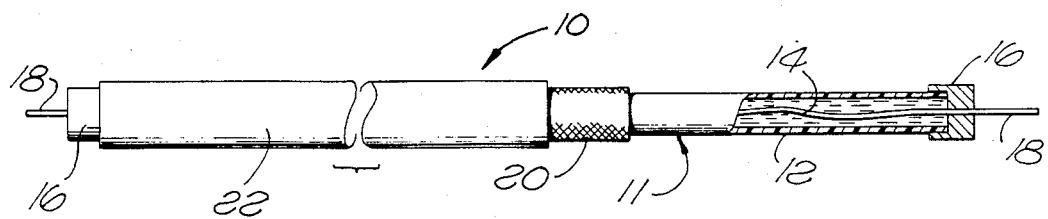
FIG. 1 is a broken partial sectional side view of a fiber optic cable containing one form of the fiber optic transmission line subassembly of the present invention incorporating a single optical fiber.

Referring now to the drawings in detail, wherein like reference characters designate like or corresponding parts throughout the various views, FIG. 1 illustrates a fiber optic cable, generally designated 10, containing one form of the fiber optic transmission line subassembly 11 of the present invention. The line 11 comprises a flexible tubular member 12 which contains an optical fiber 14 that extends lengthwise through the tubular member. The ends of the tubular member are closed by plug members 16, which may be in form of connector members for connecting to mating connector members on additional lines. The ends 18 of the optical fiber extend through the plug members 16. A metal armor layer 20 and an outer jacket 22, which may be formed of a suitable plastic, are formed over the transmission line subassembly 11 completing the cable 10. The layers 20 and 22 extend to the opposite ends of the line.

Figure 2:
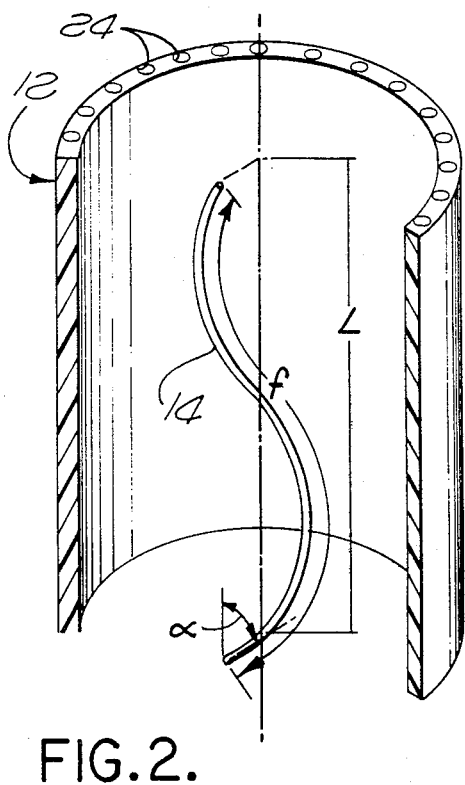
FIG. 2 is a perspective sectional view of a segment of the transmission line subassembly illustrated in FIG. 1 showing the optical fiber in a normal relaxed condition.
Figure 3:
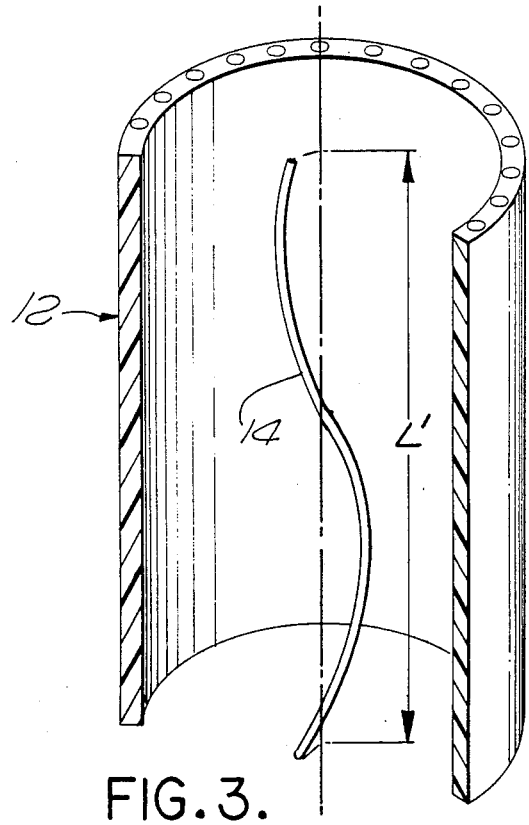
FIG. 3 is a sectional view similar to FIG. 2 but showing the form of the fiber when the transmission line is under axial load.

The flexible tubular member 12 has a relatively rigid and tough wall, which is substantially stronger than the fiber 14 so as to provide a protective cover for the fiber. The layer 20 carries substantially the load of the cable 10 during any handling of the cable, such as when the cable is lowered to the ocean floor. Layer 20 and the tubing 12 provide protection for the optical fiber against undesired exterior influences, such as water or moisture, and from influence of an organic nature, such as fish bites, bacteria, etc. A suitable material for the tubing 12 is polyethylene Helically formed metal or plastic strength members or wires 24 may be embedded in the wall of the tubular member 12 to enhance the strength thereof, as seen in FIGS. 2 and 3.

According to an important feature of the invention, the optical fiber 14 is suspended within the tubular member 12 such that no strain along the fiber axis occurs when the cable 10 is under load, either axial load or bending stresses. To accomplish this end, the optical fiber is arranged within the tubular member 12 such that its fiber axis length, designated $f$ in FIG. 2, is longer than the length of the tubular member 12 when the latter is in a relaxed condition, indicated by the dimension L in FIG. 2. In the preferred form of the invention, the optical fiber is formed as a helix, with the axis of the helix being concentric with the axis of the tubular member 12. It will be appreciated, however, that the purpose of the invention can be achieved by forming the optical fiber in different configurations, such as a sinusoidal configuration. Obviously, any wavelike configuration of the optical fiber would be appropriate so long as the fiber axis length is greater than the length of the tubular member 12. As can be readily appreciated, when the tubular member 12 is elongated, as the result of being subjected to an axial load, the length $L'$ thereof will increase as illustrated in FIG. 3, causing the pitch angle $\alpha$ of the fiber helix to decrease as well as causing the radius of the helix to decrease. In other words, the fiber helix extends axially and the convolutions decrease in diameter so that no strain is applied to the fiber along its axis as it is subjected to elongation. The same is true when the tubular member 12 is subjected to bending deformations. The pitch angle $\alpha$ of the fiber helix is chosen such that there is zero longitudinal strain in the fiber when the tubular member 12 is subjected to maximum axial loads.

Preferably the diameter of the convolutions of the helix 14 is less than the inner diameter of the tubular member 12 so that the fiber is free to shift laterally relative to the tubular member. In other words, the wall of the tubing 12 may be compressed somewhat without compressing the fiber helix.

According to another feature of the invention, the tubular member 12 is filled with a fluid-like medium 26 which restrains longitudinal and lateral movement of the fiber 14 within the member. Preferably, the fluid-like medium is a semi-fluid gelatinous substance. The specific gravity of the gelantinous medium is approximately the same as that of the optical fiber. As a consequence, there will be no tendency for the fiber to migrate within the medium either from side to side or along its length should the cable 10 be suspended vertically. It is not necessary that the specific gravity be exactly matched to the fiber but merely chosen close enough to prevent any gross motion of the fiber within the tubular member 12 in the case of vertical suspension. The gelantinous substance also lubricates the fiber, and prevents abrasion between fibers if more than one are provided in the line. The index of refraction of the medium 26 should also be smaller than that of the optical fiber 14. Suitable materials which may be utilized for the medium 26 are protein type jelly products.

Figure 4:
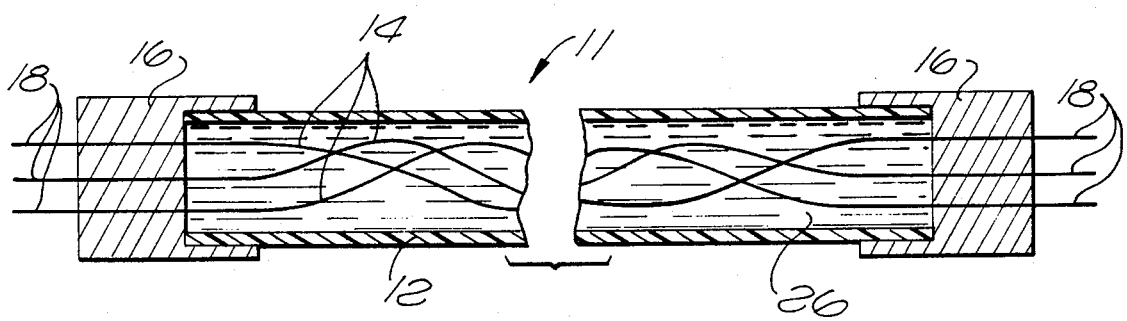
FIG. 4 is a broken longitudinal section through another fiber optic transmission line subassembly in accordance with the present invention containing a plurality of optical fibers.
Figure 5:
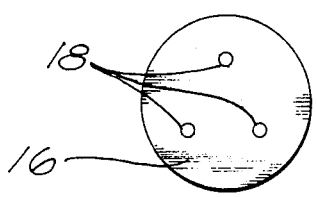
FIG. 5 is an end view of the line illustrated in FIG. 4.

FIGS. 4 and 5 illustrate another embodiment of the invention, which is similar to that illustrated in FIG. 1 except that the transmission line subassembly 11 is shown without the armoring 20 and outer jacket 22 and a plurality of optical fibers 14 are provided in the line. Three of such fibers are shown by way of example only, it being appreciated that a fewer or a greater number of fibers could be provided if desired. The fibers are disposed within the tubular member 12 in FIG. 4 so that they are spaced from each other. The helically formed fibers have a common axis and have substantially equal convolution diameters. The convolutions of the helical fibers are alternately disposed and spaced relative to each other. As seen in FIG. 5, the ends 18 extend outwardly through an end plug member 16.

Reference is now made to FIGS. 6a–6e which illustrate the various steps for making the transmission line subassembly 11 illustrated in FIGS. 4 and 5. The same method is used for making the line 11 in FIG. 1 except only a single fiber 14 is used.

Figure 6A:
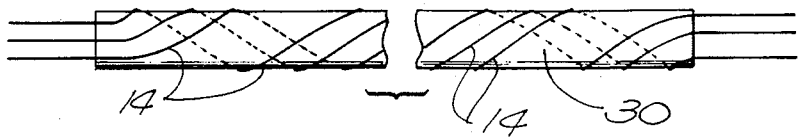
FIGS. 6a–6e illustrate the various steps which may be utilized for producing the fiber optic transmission line subassembly of the present invention.
Figure 6B:
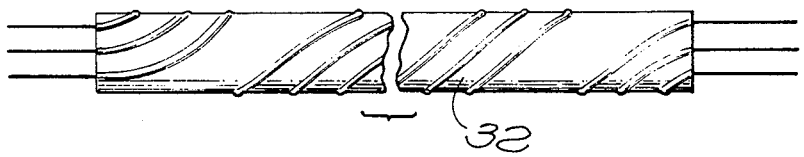
Figure 6C:
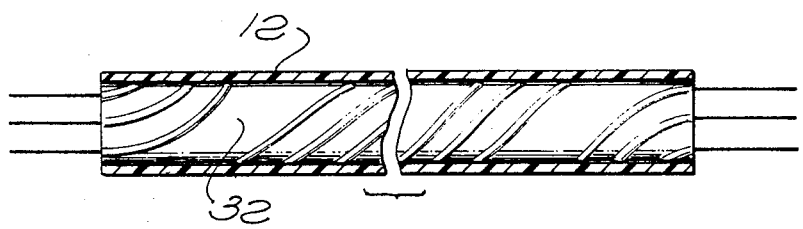
Figure 6D:
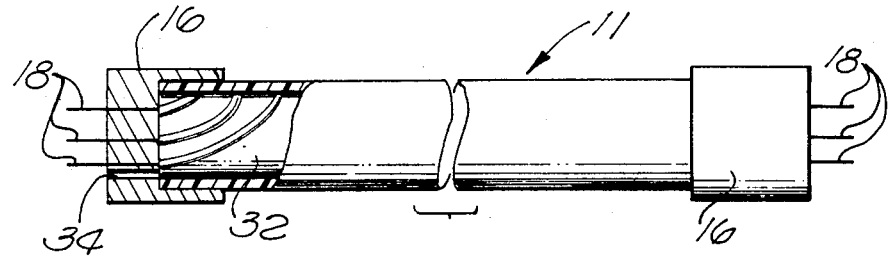
Figure 6E:
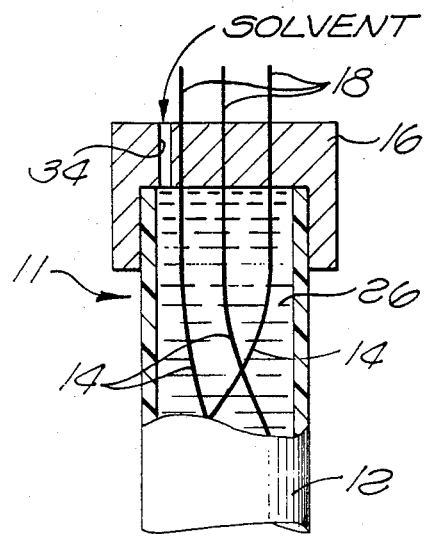

The optical fibers 14 are first layed over a core 30 in a helical configuration as seen in FIG. 6a using similar techniques to wire winding methods. The core is formed of a material which is capable of becoming the semi-fluid gelatinous substance 26 when subjected to a suitable solvent. It is noted that the convolutions of the helically wound fibers 14 are in spaced-apart relationship on the core 30. As seen in FIG. 6b, a layer 32 is then formed over the core 30 carrying the fibers 14. The layer serves to stabilize the fibers on the core. The layer 32 may be applied to the core by spraying or other methods. Thereafter, the tubular member 12 is formed over the core 30 having the fibers 14 retained thereon by the sleeve 32, as best seen in FIG. 6c. Preferably, the tubing 12 is extruded over the interior assembly. The plug members 16 are then mounted on the ends of the tubular member 12 as seen in FIG. 6d, with the ends 18 of the fibers extending through the plug members. One of the plug members 16 has a passage 34 therethrough which opens into the interior of the tubular member 12. The tubular member is then vertically disposed and a solvent is introduced through the passage 34 into the interior of the tubular member, as seen in FIG. 6e, causing the core 30 and layer 32 to soften, thereby producing the semi-fluid gelantinous substance 26 which restrains longitudinal and lateral movement of the helically wound fibers within the tubular member. After the solvent has been added to the tubular member, the passage 34 may be closed by a suitable plug or potting material. Since the medium 26 is desired to be only semi-fluid, having a gel-like consistency which tends to support the fibers within the tubing 12, it will be appreciated that the solvent which is utilized in the method of the present invention is chosen so that it will not completely dissolve the core 30 and layer 32. By way of example only, if the material of the core 30 and layer 32 is a protein (glutein or gelatine basis), the solvent may be water. Preferably 2% mercury chloride is added to the water to prevent fungus growth.

Figure 7:
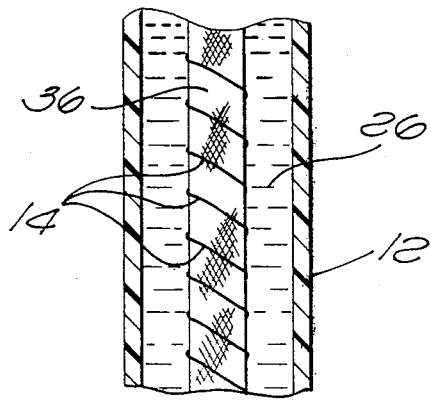
FIG. 7 is a fragmentary longitudinal section through a modified form of a transmission line in accordance with the invention.

The foregoing transmission line structure and method may not be completely satisfactory for helical optical fibers having relatively small pitch angles, for example, 10° or less. Such small pitch angle fibers may suffer mechanical instability problems. To minimize these problems, a spongy-like inner core structure which is not dissolved by the solvent is provided inside the core 30. Such inner core may be an organic fiber mesh or braid. Since the inner core does not dissolve, it remains after the core 30 is subjected to the solvent, providing a more solid-like supporting substrate for the helical fibers than the gelantinous substance 26. Such a supporting substrate is indicated by reference numeral 36 in FIG. 7 which illustrates a section of transmission line identical to that shown in FIG. 4 except for the substrate.

Although the methods described above do not include the steps of providing armoring and jacketing for the tubing 12 to complete the cable structure, it will be appreciated that such layers may be applied to the tubing in a conventional manner, using standard cable processing equipment, preferably after the plug members 16 have been added to the tubing 12 and prior to conveying the solvent into the tubing to soften the core material therein.

It will be appreciated that by the present invention there is provided a fiber optic transmission line subassembly in which the optical fibers therein are more or less free floating. Hence, the fibers are capable of shifting laterally within the protective casing 12 of the line, and are capable of extending lengthwise without exerting axial forces to the fibers themselves. As a consequence, the line 11 may be utilized either alone or processed with other lines to form a multi-strand cable, without damage occurring to the optical fibers due either to axial or bending loads being applied to the casing. The gelatinous medium 26 provided in the casing 12 maintains the convolutions of the optical fibers separated, so that they will not become abraded or broken, and maintains the helical configuration of the fibers when the line 11 is disposed vertically so that axial stresses to the fibers will not occur even though the casing 12 of the line is extended. Thus, by the present invention, optical signals may be transmitted through the cable 10 incorporating the fiber optic line 11 without degradation of the signals, or damage to the fibers.

What is claimed is:

1. A fiber optic transmission line for an optical signal transmitting cable comprising:
    a flexible, liquid impermeable tubular member;
    a plurality of optical fibers loosely positioned lengthwise in said tubular member;
    said fibers having a fiber axis length greater than the length of said tubular member when the latter is in relaxed condition whereby said fibers are essentially free of axial stress when said tubular member is under load, each said fiber being in the form of a helix, said helical fibers having a common axis and substantially equal convolution diameters, the convolutions of said helical fibers being alternately disposed and in spaced relation to each other; and
    fluid-like gelatinous means substantially filling said tubular member restraining longitudinal and lateral movement of said fibers relative to each other and said tubular member.

2. A transmission line assembly as set forth in claim 1 wherein:
    said means has a specific gravity substantially the same as that of said fiber.

3. A transmission line assembly as set forth in claim 1 wherein: the index of refraction of said means is less than that of said fiber.

4. A transmission line assembly as set forth in claim 1 including:
    a supporting substrate core inside said helices.

5. A method of making a fiber optic transmission line comprising the steps of:
    helically winding an optical fiber around a core formed of a material capable of becoming a semi-fluid gelatinous substance when subjected to a solvent;
    forming a sleeve over said core to retain said optical fiber thereon, said sleeve also being formed of a material cable of becoming a semi-fluid gelantinous substance when subjected to said solvent;
    forming a protective tubular member around said sleeve; and
    filling the interior of said tubular member with said solvent to soften said core and sleeve.

6. A method as set forth in claim 5 wherein:
    a plurality of optical fibers are helically wound around said core in spaced relationship with each other.

7. A method as set forth in claim 5 including the step of:
    mounting plug members in the ends of said tubular member with the ends of said fiber extending through said plug members.

8. A method as set forth in claim 5 wherein:
    said sleeve is formed over said core by applying a resin coating to said core and fiber.

9. A method as set forth in claim 5 wherein:
    said tubular member is extruded over said core.

* * * * *